United States Patent
Yajima et al.

(10) Patent No.: US 6,983,910 B2
(45) Date of Patent: Jan. 10, 2006

(54) MEMBRANE STRUCTURE

(75) Inventors: Nobuyuki Yajima, Sagamihara (JP); Naoki Izutsu, Sagamihara (JP); Hideyuki Honda, Sagamihara (JP)

(73) Assignee: Independent Administrative Institution, The Japan Aerospace Exploration Agency, Chofu (JP)

( * ) Notice: Subject to any disclaimer, the term of this patent is extended or adjusted under 35 U.S.C. 154(b) by 283 days.

(21) Appl. No.: 10/310,840

(22) Filed: Dec. 6, 2002

(65) Prior Publication Data

US 2003/0111577 A1 Jun. 19, 2003

(30) Foreign Application Priority Data

Dec. 13, 2001 (JP) .................... 2001-380171

(51) Int. Cl.
*B64B 1/42* (2006.01)

(52) U.S. Cl. ........................................... 244/30
(58) Field of Classification Search ............... 244/31, 244/30, 126, 125, 128
See application file for complete search history.

(56) References Cited

U.S. PATENT DOCUMENTS

| | | | | |
|---|---|---|---|---|
| 1,835,260 A | * | 12/1931 | Barrera | 244/30 |
| 3,346,216 A | * | 10/1967 | Desmarteau | 244/30 |
| 4,265,418 A | | 5/1981 | Eymard | |
| 4,390,149 A | * | 6/1983 | Barnes et al. | 244/31 |
| 4,711,416 A | * | 12/1987 | Regipa | 244/31 |
| 4,934,631 A | * | 6/1990 | Birbas | 244/30 |
| 6,290,172 B1 | | 9/2001 | Yajima et al. | |

FOREIGN PATENT DOCUMENTS

| | | | |
|---|---|---|---|
| DE | 366690 | | 1/1923 |
| DE | 198 31 631 | | 1/2000 |
| GB | 23277 | * | 10/1912 |
| GB | 149 447 | | 8/1920 |
| GB | 237 125 | | 7/1925 |
| JP | 55-4276 | | 1/1980 |
| JP | 220999 | * | 9/1990 |
| JP | 2000-25695 | | 1/2000 |
| JP | 2002-2595 | | 1/2002 |

OTHER PUBLICATIONS

U.S. Appl. No. 10/288,544, filed Nov. 6, 2002, pending.

* cited by examiner

*Primary Examiner*—Tien Dinh
(74) *Attorney, Agent, or Firm*—Oblon, Spivak, McClelland, Maier & Neustadt, P.C.

(57) ABSTRACT

A membrane structure includes an airtight pressure-resistant gasbag and a shape maintaining mechanism which maintains the gasbag in a predetermined shape when the gasbag is in a fully inflated state. The gasbag includes a plurality of spindle-shaped gores of an airtight membrane material, adjacent gores joined together at edges, and a plurality of reinforcing ropes attached to joined sections of the edges, the reinforcing ropes extending along the edges, respectively. Each of the gores outwardly protrudes between two adjacent reinforcing ropes extending along the edges of the gore, respectively, without elongation of the airtight membrane material, when the gasbag is in the fully inflated state. Each protruding gore has a radius of curvature in a direction intersecting the two adjacent reinforcing ropes. The radius of curvature is smaller than a radius of the gasbag.

8 Claims, 5 Drawing Sheets

MEMBRANE STRUCTURE

CROSS-REFERENCE TO RELATED APPLICATIONS

This application is based upon and claims the benefit of priority from the prior Japanese Patent Application No. 2001-380171, filed Dec. 13, 2001, the entire contents of which are incorporated herein by reference.

BACKGROUND OF THE INVENTION

1. Field of the Invention

The present invention relates to a membrane structure and, more particularly, to a membrane structure used for an airship or a membrane structure built on the ground.

2. Description of the Related Art

Conventionally, a non-rigid airship that adopts a gasbag made of a membrane material, instead of an outer shell formed from a hard material such as a light metal, is made lightweight by increasing the strength of the membrane material. However, if an airship flies at a high altitude, where the pressure on the membrane material is significant, a large tensile force is generated on the gasbag. Since the membrane material must have a strength that resists such a large tensile force, it is difficult to reduce the weight of the gasbag. Hence, it is not easy to reduce the weight of the membrane structure.

As membrane structures built on the ground, structures whose shape is maintained by pressurizing the membrane structure from the inside are known. Such membrane structures are often used for simple buildings constructed in exhibition grounds or amusement parks. The structures are also used for the roofs of large buildings such as all-weather baseball and football stadiums. In such structures, a large tensile force is generated in the membrane that must maintain a certain shape against the weight of the membrane itself and forces such as wind pressure. A membrane structure built on the ground therefore must have a membrane resilient to splitting.

Additionally, flying objects that place observation devices or communication devices at predetermined positions for scientific observation or communication in the stratosphere at an altitude of, e.g., 20 to 40 km have been studied. A super-pressure balloon is known as a membrane structure for such purposes. A super-pressure balloon has a gasbag resistant to internal pressure. Even when the balloon reaches the maximum volume, no gas generating buoyancy for rising is discharged. The balloon continuously rises while maintaining the same internal gas pressure. As the air density decreases, the buoyancy decreases. Then, the balloon flies horizontally at a predetermined altitude.

Since a super-pressure balloon has a flat spherical shape, the air resistance is high. Hence, a super-pressure balloon cannot remain at a predetermined position, due to air currents.

BRIEF SUMMARY OF THE INVENTION

A membrane structure comprises:

an airtight pressure-resistant gasbag including a plurality of spindle-shaped gores of an airtight membrane material, adjacent gores joined together at edges, and a plurality of reinforcing ropes attached to joined sections of the edges, the reinforcing ropes extending along the edges, respectively, and, a shape maintaining mechanism which maintains the gasbag in a predetermined shape, when the gasbag is in a fully inflated state.

Each of the gores outwardly protrudes between two adjacent reinforcing ropes extending along the edges of the gore, respectively, without elongation of the airtight membrane material, when the gasbag is in the fully inflated state.

Each protruding gore has a radius of curvature in a direction intersecting the two adjacent reinforcing ropes. The radius of curvature is smaller than a radius of the gasbag.

Each protruding gore is subject to a tensile force which is directed in the direction intersecting the two adjacent reinforcing ropes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
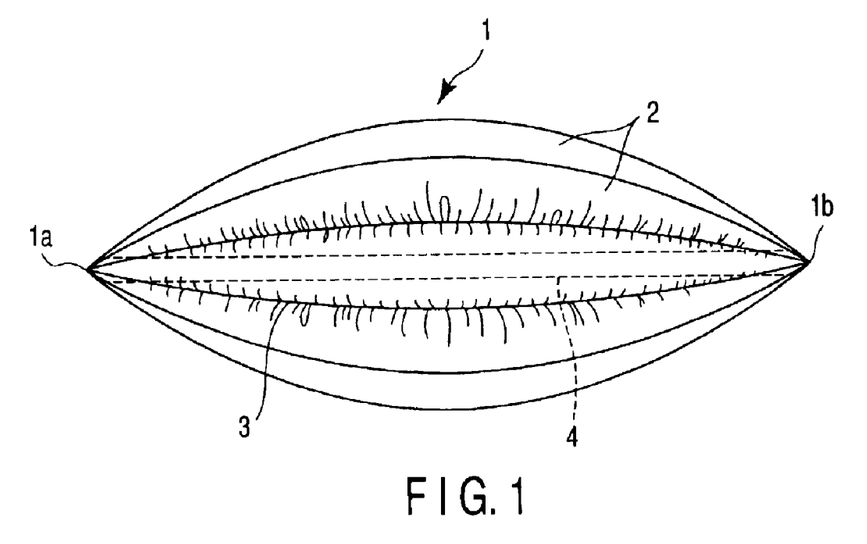
FIG. 1 is a side view of a membrane structure according to a first embodiment.

A membrane structure according to the first embodiment is used for an airship. FIG. 1 is a side view of the membrane structure. A gasbag 1 is filled with, e.g., helium, which generates buoyancy. The gas is not discharged after inflation, and the gasbag 1 maintains the internal pressure. Thrusters, solar batteries for supplying power to the thrusters, and a payload such as an observation device, are attached to the gasbag 1 (not shown).

The gasbag 1 has a plurality of gores 2 each having a spindle shape. Each gore 2 has a shape obtained by equally dividing the gasbag 1 into N parts. The gores 2 are formed from an airtight membrane material such as a lightweight and strong textile or plastic film. The gores 2 adjacent to each other are joined at edges. The adjacent gores 2 are sown or bonded at their edges. High tensile reinforcing ropes 3 are attached to joined sections of the edges, and extend along the edges. The ropes 3 are attached, by sewing or bonding, and enhance the bonding strength between the gores 2 and maintain the gasbag 1 in a predetermined shape. When the gasbag 1 is in a fully inflated state, each of the gores 2 outwardly protrudes between two adjacent reinforcing ropes 3 extending along the edges of the gore 2, respectively, without elongation of the airtight membrane material forming the gore 2. The term "fully inflated state" used here means a state wherein an internal/external pressure difference $\Delta P$ (=internal pressure−external pressure) at an arbitrary position on the membrane material is zero or more, and the gasbag 1 is inflated while maintaining the internal pressure, external pressure, and tensile force on the gasbag 1 balanced.

The membrane structure has a shape maintaining mechanism that maintains the gasbag 1 in a predetermined shape when the gasbag 1 is in the fully inflated state. In this embodiment, the shape maintaining mechanism has a press member. Each of the reinforcing ropes 3 includes press portions which are located at ends of the gore 2 to which the reinforcing rope 3 is attached. The press member presses the press portions toward the outside of the gasbag 1 from the inside of the gasbag 1 to slenderize the gasbag 1 without elongation of the membrane forming each gore 2. The press member includes a beam 4 which is arranged in the gasbag 1 and extends between the ends of each gore 2. That is, the beam 4 extends between two ends 1*a* and 1*b* of the gasbag 1. The beam 4 defines the length of the gasbag 1 in the longitudinal direction of the gore 2, i.e., the length between the two ends 1*a* and 1*b* of the gasbag 1. In place of the beam 4, the press member may include a keel that is arranged in a semi-rigid airship.

The shape of the gasbag 1 in the fully inflated state will be described. For convenience, the shape of the gasbag 1 which dose not have the beams 4 and the reinforcing ropes 3 will be described. When the internal/external pressure difference $\Delta P$ of the gasbag 1 is sufficiently large, the gasbag 1 has a shape similar to a specific shape called Euler's elastica. This shape is a center-symmetrical one such as a sphere squashed from left and right sides. The shape of the gasbag 1 is made by pressing both ends, 1*a* and 1*b*, together. When the shape of the gasbag 1 is Euler's elastica, and as long as the meridian length is constant (condition 1) and the latitudinal (peripheral) length can be freely increased whenever necessary (condition 2), the maximum volume, i.e., maximum buoyancy is obtained. The axis passing through the ends 1*a* and 1*b* of the gasbag 1 is regarded as the earth's axis. Condition 2 means that creases extending in the meridian direction are generated on the gasbag 1. Therefore, no tensile force acts in the latitudinal direction. A tensile force on the gasbag 1 due to the pressure difference $\Delta P$ acts in the meridian direction. When the pressure difference $\Delta P$ is sufficiently high, the weight and the buoyancy of the membrane material forming the gasbag 1 are expected to influence the shape of the gasbag 1 little.

Figure 2:
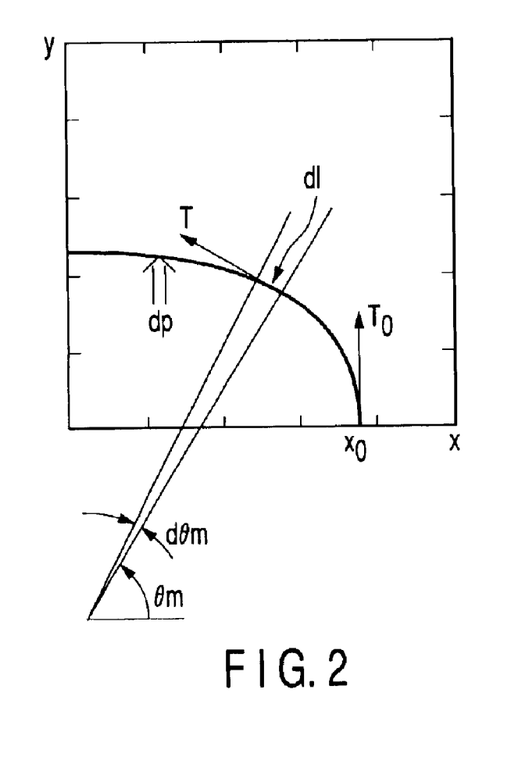
FIG. 2 is a schematic sectional view of a gasbag, which is used to obtain Euler's elastica.

Euler's elastica can be obtained in the following way. FIG. 2 is a schematic sectional view of the gasbag 1. In FIG. 1, the axis passing through the ends 1*a* and 1*b* of the gasbag 1 is directed from side to side. In FIG. 2, this axis is parallel to the y-axis.

The shape of the gasbag 1 is center-symmetrical. The shape on the North Pole side as viewed from the plane of symmetry, or equatorial plane, that is, the shape of the northern hemisphere will be considered. Let $x_0$ be the radius at the equator. Since a tensile force acts in the meridian direction only, the total sum $F_m$ of the tensile forces along the equator is the product of the sectional area S encircled by the equator and the pressure difference $\Delta P$.

$$F_m = S \cdot \Delta P \tag{1}$$

The tensile force $T_0$ at the equator and the tensile force T at any given point (x, y) on the gasbag 1 are respectively expressed by equations (2) and (3) below.

$$T_0 = F_m/(2\pi x_0) \tag{2}$$

$$T = F_m/(2\pi x) = x_0^2 \cdot \Delta P/(2 \cdot x) \tag{3}$$

The radius of curvature on the gasbag 1 is given by:

$$dL/d\theta_m = T/\Delta P \tag{4}$$

where L is the length of the meridian, dL is the length of an infinitesimal section on the meridian and $\theta_m$ is the angle of inclination of dL.

Figure 3:
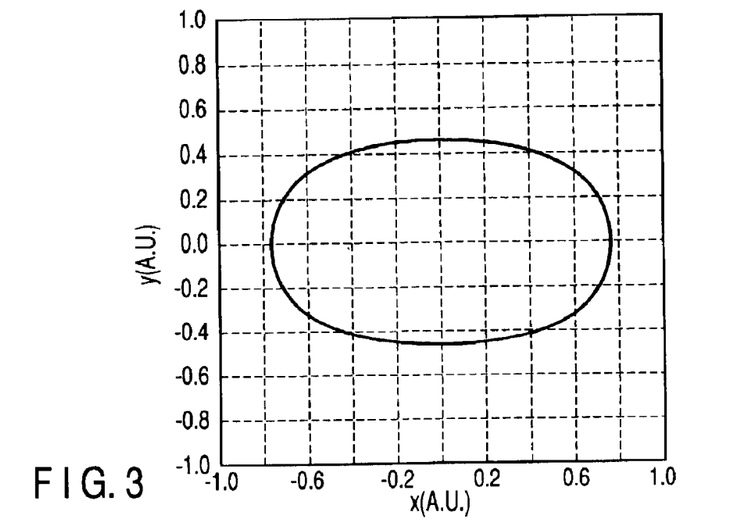
FIG. 3 is a graph showing a curve indicating the longitudinal section of Euler's elastica obtained by numerical solution.

Differential equation (4) is solved by numerical solution. The shape of each dL is sequentially determined, starting from the equator. Here, initial condition that the tensile force at the equator is parallel to the y-axis and has the magnitude of $T_0$ is given. FIG. 3 shows a curve indicating the longitudinal section of Euler's elastica obtained by numerical solution. In this embodiment, the payload is attached to the membrane structure. Therefore, the shape of the gasbag 1 deviates a little from the one that is symmetrical. The deviation is, however, practically negligible.

When the beams 4 are attached to the gasbag 1 under the above conditions, the shape of the gasbag 1 is obtained in the following way on the basis of Euler's elastica. This shape satisfies the modified equation (4)

$$dL/d\theta_m = T'/\Delta P \tag{4}$$

Here, the tensile force T' on gasbag 1 in the modified equation (4) is assumed parallel to the y-axis and smaller than the tensile force T in the case of determination of Euler's elastica.

$$T' = T + dT (dT < 0) \tag{5}$$

The shape of gasbag 1 with the beams 4 is obtained by solving equation (4), using equation (5).

Figure 4:
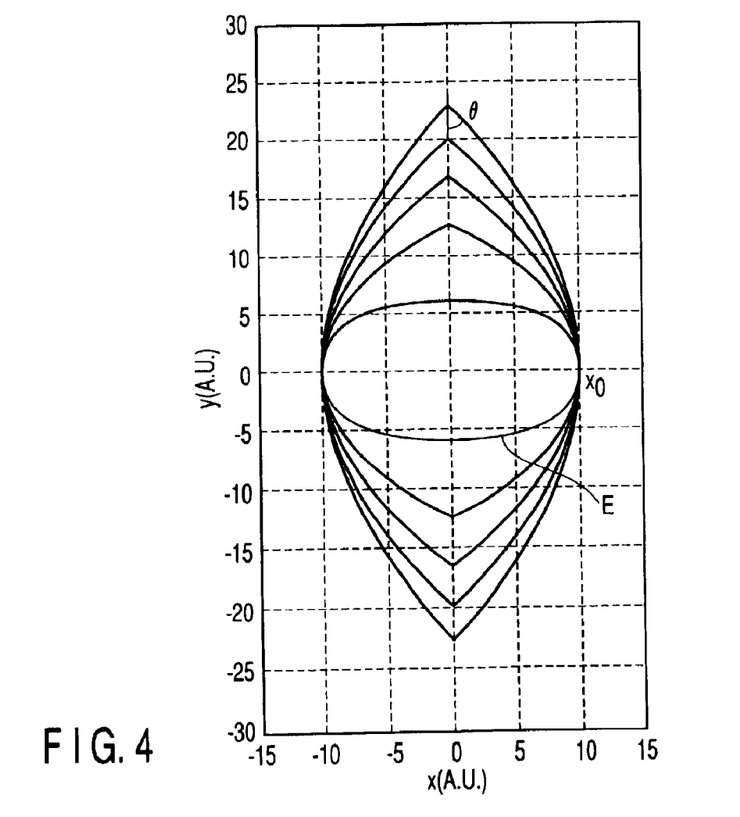
FIG. 4 is a graph showing curves indicating sections of gasbags to which beams are attached, respectively.

FIG. 4 shows curves indicating sections of the gasbag 1 with the beams 4, which are obtained by solving equation (4). The two ends 1*a* and 1*b* (FIG. 1) of the gasbag 1 are arranged on the upper and lower sides in FIG. 4. A curve E indicates Euler's elastica. FIG. 4 shows curves for three typical shapes with radius $x_0$ at the equator. Shown in FIG. 4, a wide variety of shapes are obtained by changing the parameters, such as radius $x_0$ at the equator and the length of the beams 4. The shape of the membrane structure according to this embodiment has a high degree of freedom. Letting $\theta$ be the vertical angle of the end of the gasbag 1, i.e., the angle at which the curve crosses the y-axis, a compression force $F_C$ applied to the beams 4 is given by $$F_C = 2\pi x_0 \cdot T' \cdot \cos \theta \tag{6}$$

The shape of the gasbag 1 when the reinforcing ropes 3 are added to the gasbag 1 having the shape shown in FIG. 4 will be described next. When the gasbag 1 has the shape shown in FIG. 4, the gore 2 has a spindle shape obtained by equally dividing the shape shown in FIG. 4 into N parts. In this embodiment, each gore 2 has a shape such that the gore 2 protrudes with a small curvature without elongation of the membrane material forming the gore 2. The gore 2 has a sufficiently large size in the longitudinal direction.

To achieve the shape of each of gores 2 with the reinforcing ropes 3, the gore 2 has a size larger than that of the gore of the gasbag having the shape shown in FIG. 4. More specifically, the width of each gore 2 is much larger than the distance between the adjacent reinforcing ropes 3 attached to the gore 2, when the gasbag 1 is in the fully inflated state. The length of each gore 2 is larger than the length of the reinforcing rope 3 attached to the gore 2. The length of each edge of the gore 2 is larger than the length of each reinforcing rope 3. The reinforcing ropes 3 are attached to the gores 2 while maintaining the gores 2 pleated. Each of the gores 2 is shortened by pleating them so that the length of each edge of the shortened gores 2 is equal to the length of each reinforcing rope 3 attached to the shortened gores 2.

Hence, each gore 2 protrudes without elongation of the membrane material. When each protruding gore 2 has a predetermined shape, the tensile force in the longitudinal direction of each gore 2 is almost negligible. More specifically, the tensile force on the protruding gore 2 is directed in the direction intersecting the two adjacent reinforcing ropes 3. The tensile force on the gore 2 in the width direction acts on the reinforcing rope 3 attached to the gore 2, thus the reinforcing rope 3 is pulled outward. Then, the tensile force on the gore 2 is supported by the reinforcing ropes 3.

Each protruding gore 2 has a radius of curvature in a direction intersecting the two adjacent reinforcing ropes 3 attached to the gore 2. The radius of curvature is much smaller than a radius of the gasbag 1. In general airships whose gores do not protrude, the radius of the airship body is about 10 to 30 m. The radius of the gasbag 1 is almost the same. And, the radius of curvature of the protruding gore 2 can be almost 1 m. The tensile force generated on the gasbag 1 decreases in accordance with the ratio of the radius of curvature of the gore 2 and the radius of the gasbag 1. As the tensile force decreases, the pressure resistance of the membrane structure increases.

Reduction of the radius of curvature of the gore 2 can be realized independently of the scale of the membrane structure. This means that the strength of the membrane structure against pressure does not depend on the volume of the membrane structure. Hence, the strength of the membrane structure of this embodiment does not depend on size. In addition, the degree of freedom in shape is large, as described with reference to FIG. 4. This is especially effective when the membrane structure of this embodiment is used for an airship designed to have low air resistance.

Figure 5:
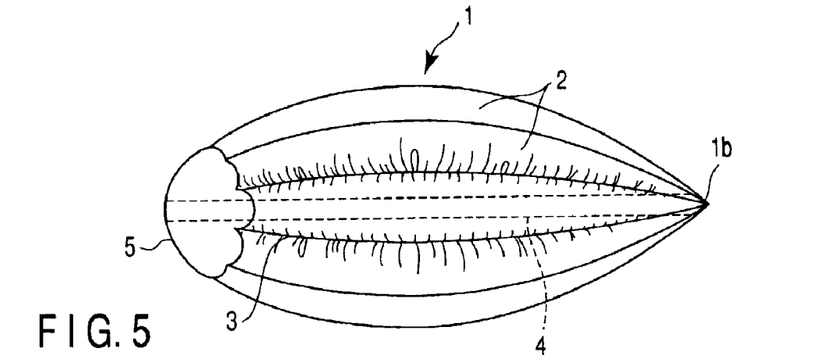
FIG. 5 is a side view of a membrane structure according to a modification of the first embodiment.

A hard shell 5 may be arranged at one end of the gasbag 1. FIG. 5 is a side view of a membrane structure having the shell 5. The shell 5 has an almost domelike shape. The ends of the gores 2 and the reinforcing ropes 3 are fixed at a portion corresponding to the foot of the domelike-shaped shell 5. The beam 4 extends between the end 1b of the gasbag 1 and a portion corresponding to the apex of the shell 5.

The shape of the gore 2 between the end 1b and the foot of the shell 5 is the same as that of the gore 2 shown in FIG. 1. The surface of the each gore 2 smoothly continues to the surface of the shell 5. The apex of the shell 5 has a smooth curved surface. With this structure, when the airship thrusts against the air current from the shell 5 side, the air is displaced less. Hence, the air resistance can be suppressed.

Figure 6:
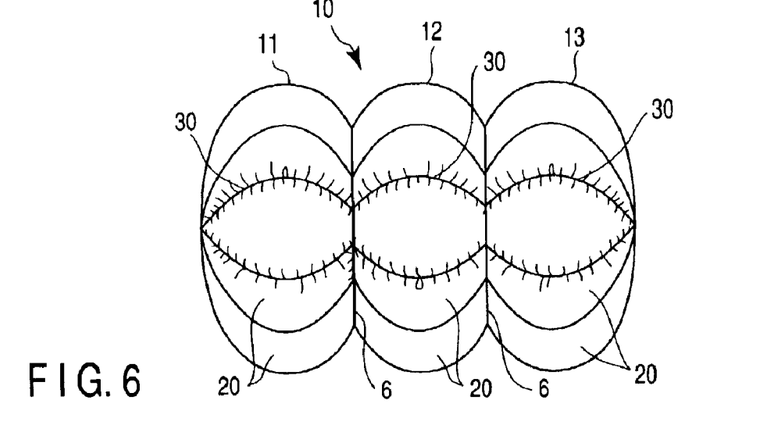
FIG. 6 is a side view of a membrane structure according to a second embodiment.

A membrane structure according to the second embodiment is also used in an airship. FIG. 6 is a side view of the membrane structure. As in the first embodiment, a gasbag 10 has gores 20 each having sharp ends. Each gore 20 has a shape obtained by equally dividing the gasbag 10 into N parts. Adjacent gores 20 are joined at their edges. The gores 20 are formed of the same membrane material as used in the first embodiment. Reinforcing ropes 30 are attached along the joint lines of the gores 20. In this embodiment, the shape maintaining mechanism includes at least one encircling member 6 extending around the gasbag 10 to cross the reinforcing ropes 30. The encircling member 6 has an annular shape and is perpendicular to the reinforcing ropes 30. As the encircling member 6, a rope, a tape, or a hard ring resistant to a high tensile force is used. The angle between the encircling member 6 and the reinforcing rope 30 is not limited to 90°. The portion of the gasbag 10 encircled by the encircling member 6 may have either a circular shape or an elliptical shape. The encircling member 6 may also spiral around the gasbag 10.

When the gasbag 10 is in the fully inflated state, the encircling members 6 narrow the encircled portion of the gasbag 10. In FIG. 6, two narrow portions are generated. However, the number of narrow portions may be one, or three or more. The gasbag 10 is divided into three parts by the narrow portions. These three parts are defined as inflated portions 11, 12, and 13. Each gore 20 outwardly protrudes between the reinforcing ropes 30 without elongation of the membrane material.

The gasbag 10 has the following shape. At first, a case wherein no reinforcing ropes 30 are used and the gores 20 do not protrude will be explained. The width (length in the direction perpendicular to the longitudinal direction) of the gores 20 is sufficiently large. Therefore, the length of the annular path around the gasbag 10 extending parallel to the annular encircling members 6 is much larger than the distance around the annular encircling members 6. The annular path around the gasbag 10 dose not pass near the two ends of each gore 20. Thus, the shapes of the inflated portions 11 and 13 located at both sides are of Euler's elastica. This can be explained in the same manner as in the first embodiment.

Figure 7:
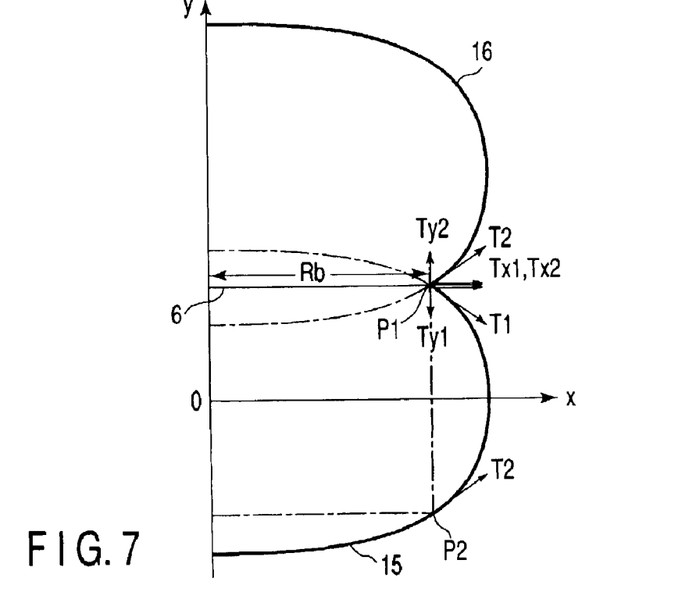
FIG. 7 is a schematic sectional view of the gasbag according to the second embodiment to show the balance of tensile force.

Portions of the gasbag 10 located near both sides of each narrow portion are symmetrical to each other. More specifically, the portions of the gasbag 10 are plane-symmetrical with respect to the plane encircled by the encircling member 6. This can be described in the following way. FIG. 7 is a schematic sectional view of the gasbag 10 indicating the balance of tensile force. For simplicity, two inflated portions 15 and 16 are described. In FIG. 6, the inflated portions 11, 12, and 13 are arranged from side to side. In FIG. 7, the inflated portions 15 and 16 are arranged vertically. The y-axis passes through the center of the annular encircling member 6 and is perpendicular to the plane encircled by the encircling member 6. The x-axis is perpendicular to the y-axis. As described above, since the length of the annular path around the gasbag 10 extending parallel to the annular encircling members 6 is much larger than the distance around the annular encircling members 6, each of the inflated portions 15 and 16 has the shape of Euler's elastica and is in the shape of a sphere pressed from positive and negative directions of the y-axis.

The balance of forces at a point P1 on the encircling member 6 will be examined. The tensile forces T1 and T2 act on inflated portions 15 and 16 at the point P1, respectively. The y-axis components Ty1 and Ty2 of the tensile forces T1 and T2 have the same magnitude and reverse directions. The components Ty1 and Ty2 are canceled. The sum of x-axis components Tx1 and Tx2 of the tensile forces T1 and T2 balances with the tensile force of the encircling member 6. Consequently, the tensile forces T1 and T2 are symmetrical with respect to a line that passes through the point P1 and is parallel to the x-axis. When the differential equation (4) given by $$dL/d\Theta_m = T/\Delta P \tag{4}$$

is sequentially calculated by numerical solution from the encircling member 6 to the positive and negative directions of the y-axis, the shape of each of the inflated portions 15 and 16 can be obtained. Since initial conditions for the inflated portions 15 and 16 on the encircling member 6 are the same, the inflated portions 15 and 16 are plane-symmetrical with respect to the plane encircled by the encircling member 6.

Figure 8:
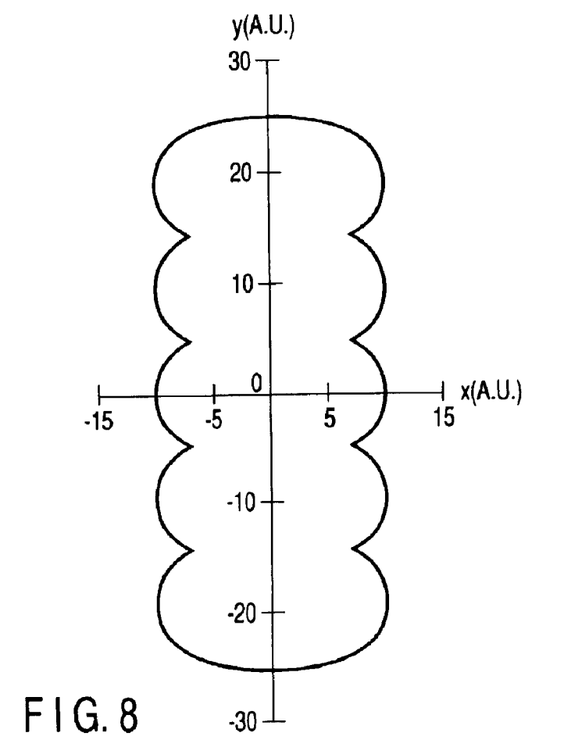
FIG. 8 is a graph showing a curve indicating the section of the gasbag according to the second embodiment, which is obtained by numerical solution.

Let Rb be a radius of the encircling member 6 (distance between the y-axis and the point P1). When an additional encircling member having the radius Rb is arranged at a portion (indicated by the point P2 in FIG. 7) of the inflated portion 15 having the radius (distance between the y-axis and the gore) equal to the radius Rb, an additional inflated portion having the same shape as that between the points P1 and P2 is generated. The inflated portion 15 is between the generated additional inflated portion and the inflated portion 16. Here, assume that a membrane material corresponding to the additional inflated portion is added to the gore 20. When more encircling members having the radius Rb are added, the shape such that a plurality of inflated portions, each having the same shape, are connected in a line can be obtained (except the shape of the inflated portions located at the two ends). FIG. 8 shows a curve indicating the section of the gasbag 10, which is obtained by numerical solution. The x- and y-axes are set as in FIG. 7. As described above, when the encircling members are used, a long membrane structure can be formed. If this membrane structure is used for an airship, it is more suitable than a membrane structure shape having no encircling members.

In FIG. 8, encircling members having equal radii are used. However, encircling members of different radii may also be used, producing different shapes. Either way, the gasbag 10 would be plane-symmetrical with respect to planes encircled by the encircling members. In the gasbag shown in FIG. 7 or 8, each gore has a shape obtained by dividing the gasbag into N parts by a semi-plane having the y-axis as one side. In the membrane structure having the reinforcing ropes 30, each gore 20 protrudes with a small radius of curvature between the adjacent reinforcing ropes 30, without elongation of the membrane material.

The gore 20 in this embodiment has a size larger than that of the gasbag having the shape shown in FIG. 7 or 8. Also, as in the first embodiment, the reinforcing ropes 30 are attached to the gores 20 having pleats formed thereon. Each gore 20 has a shape such that the tensile force in its longitudinal direction is almost zero. The reinforcing ropes 30 extending on the inflated portions 11, 12, and 13 conform to Euler's elastica.

The membrane structure in this embodiment has various advantages. Usage of the encircling members enhances the degree of freedom in shape. In addition, since each gore 20 protrudes with a small radius of curvature without the elongation of the membrane material, the membrane structure is highly resistant to splitting.

Figure 9:
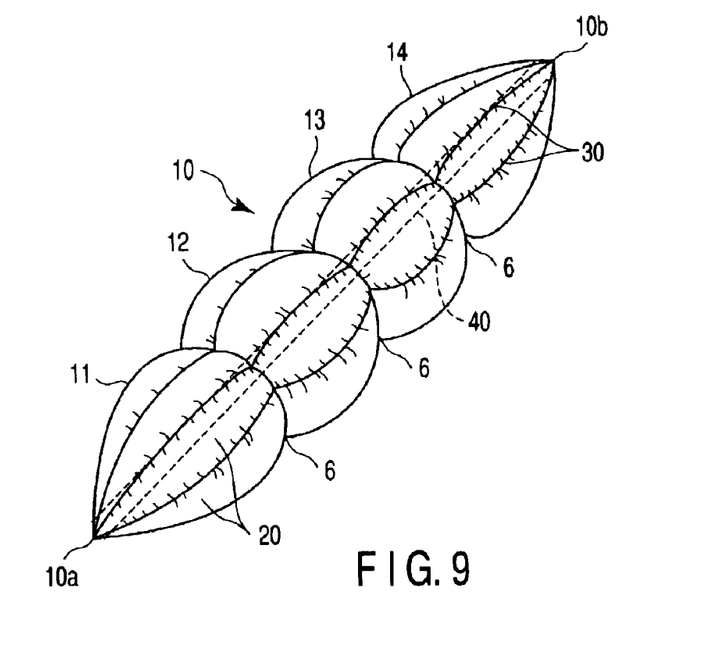
FIG. 9 is a perspective view of a membrane structure according to a third embodiment.

The shape maintaining mechanism used in a membrane structure according to the third embodiment has encircling members 6 and a press member which slenderizes the gasbag 10. FIG. 9 is a perspective view of the membrane structure. A plurality of inflated portions 11, 12, 13, and 14 divided by the encircling members 6 are generated. Beam 40 used as the press member is attached between the two ends of each gore 20, i.e., between ends 10a and 10b of the gasbag 10.

Figure 10:
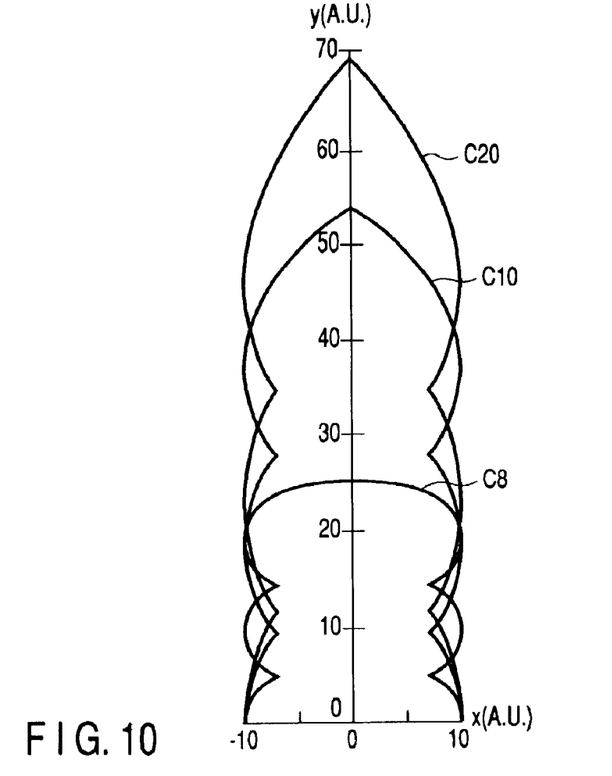
FIG. 10 is a graph showing curves indicating sections of the gasbag according to the third embodiment, which is obtained by numerical solution.

The inflated portions 11, 12, 13, and 14 are plane-symmetrical with respect to planes encircled by the encircling members 6, respectively, and each of the inflated portions is in the shape of part of the gasbag 1 described in the first embodiment with reference to FIG. 1. This is obvious from the description in the first and second embodiments. FIG. 10 shows curves indicating sections of the gasbag 10 according to this embodiment, which is obtained by numerical solution. The x- and y-axes are as shown in FIG. 8. Curves C10 and C20 indicating two typical sections are shown. A curve C8 is the same as the curve of the section shown in FIG. 8. These curves C8, C10, and C20 have the same number of narrow portions.

As in the first and second embodiments, each gore 20 protrudes with a small radius of curvature between the adjacent reinforcing ropes 30, without elongation of the membrane material.

In this embodiment, the degree of freedom in shape of the gasbag 10 is particularly high. The gasbag can be larger than in the second embodiment.

Figure 11:
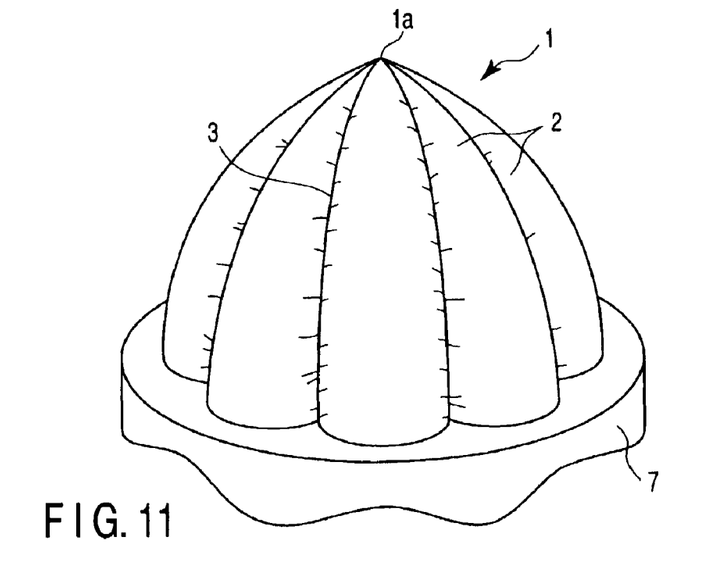
FIG. 11 is a perspective view showing a membrane structure used for a building.

The membrane structures in the first to third embodiments can also be applied to a membrane structure such that internal pressure of the structure maintains the shape of the structure, e.g., large buildings, such as all-weather baseball or football stadiums. FIG. 11 is a perspective view showing a membrane structure used for a building. This membrane structure is basically the same as in the first embodiment. The same reference numerals as in the first embodiment described with reference to FIG. 1 denote the same components in this membrane structure, and a detailed description thereof will be omitted.

The membrane structure includes part of the gasbag 1 (FIG. 1) in the first embodiment. More specifically, the part of the gasbag 1 between the end 1a and the middle is used. Each gore 2 shown in FIG. 11 is half of that in the first embodiment, and includes the part of the gore 2 in the first embodiment that extends between one end and the middle. The portion of the gore 2 shown in FIG. 11 which corresponding to the middle of the gore 2 in the first embodiment is fixed on a base 7 made of a rigid material. The fixed portions are sealed to maintain the internal pressure in the gasbag 1. The membrane structure shown in FIG. 11 has the same member as the beam 4 in the first embodiment which keeps the shape of the gasbag 1. Each gore 2 shown in FIG. 11 outwardly protrudes with a small radius of curvature without elongation of the membrane material forming the gore 2.

In this example with reference to FIG. 11, half of the gasbag 1 in the first embodiment, which extends between the end 1a and the middle of the gasbag 1, is used. Instead of using half of the gasbag 1, the part extending from the end 1a to a position located between the middle and the end 1b may be used. Alternatively, part of the membrane structure in the second or third embodiment may be used.

In a conventional membrane structure, to maintain the shape of the structure against the weight of the membrane itself and wind pressure, the internal pressure is relatively high, and a large tensile force acts on the membrane. In this example with reference to FIG. 11, since the membrane has portions that protrude with a small radius of curvature, the membrane is resistant to splitting. In addition, the degree of freedom in designing the shape of the structure is high.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A membrane structure comprising:

an airtight pressure-resistant gasbag comprising a plurality of spindle-shaped gores of an airtight membrane material, adjacent gores joined together at edges, and a plurality of reinforcing ropes attached to joined sections of the edges, the reinforcing ropes extending along the edges, respectively; and a shape maintaining mechanism configured to maintain the gasbag in a predetermined shape when the gasbag is in a fully inflated state, wherein each of the gores is configured to outwardly protrude between two adjacent reinforcing ropes extending along the edges of the gore, respectively, without elongation of the airtight membrane material, when the gasbag is in the fully inflated state, each protruding gore having a radius of curvature in a direction intersecting the two adjacent reinforcing ropes, the radius of curvature being smaller than a radius of the gasbag, each protruding gore is configured to be subject to a tensile force which is directed in the direction intersecting the two adjacent reinforcing ropes, and each of the reinforcing ropes comprises press portions located at ends of the gore to which the reinforcing rope is attached, and the shape maintaining mechanism comprises a press member configured to press the press portions toward the outside of the gasbag to slenderize the gasbag without elongation of the membrane material.

2. The structure according to claim 1, wherein each of the gores has a width which is larger than a distance between the two adjacent reinforcing ropes attached to the gore when the gasbag is in the fully inflated state, and each of the gores has a length which is larger than a length of each of the reinforcing ropes attached to the gores, and each of the gores is shortened by pleating the gore so that a length of each edges of the shortened gores is equal to a length of each of the reinforcing ropes attached to the shortened gores, and the reinforcing ropes are attached to the gores while maintaining the gores pleated.

3. The structure according to claim 1, wherein the press member comprises a beam which is arranged in the gasbag and extends between the ends of each gore.

4. The structure according to claim 1, wherein the shape maintaining mechanism comprises at least one encircling member extending around the gasbag to cross the reinforcing ropes, the encircling member configured to narrow a portion of the gasbag encircled by the encircling member when the gasbag is in the fully inflated state, and at least one narrow portion being generated.

5. The structure according to claim 4, wherein two portions of the gasbag located near sides of the narrow portion are symmetrical.

6. A membrane structure comprising:

an airtight pressure-resistant gasbag comprising a plurality of spindle-shaped gores of an airtight membrane material, adjacent gores joined together at edges, and a plurality of reinforcing ropes attached to joined sections of the edges, the reinforcing ropes extending along the edges, respectively; and a shape maintaining mechanism configured to maintain the gasbag in a predetermined shape when the gasbag is in a fully inflated state, wherein each of the gores is configured to outwardly protrude between two adjacent reinforcing ropes extending along the edges of the gore, respectively, without elongation of the airtight membrane material, when the gasbag is in the fully inflated state, each protruding gore having a radius of curvature in a direction intersecting the two adjacent reinforcing ropes, the radius of curvature being smaller than a radius of the gasbag, each protruding gore is configured to be subject to a tensile force which is directed in the direction intersecting the two adjacent reinforcing ropes, and the shape maintaining mechanism comprises at least one encircling member extending around the gasbag to cross the reinforcing ropes, the encircling member configured to narrow a portion of the gasbag encircled by the encircling member when the gasbag is in the fully inflated state, and at least one narrow portion being generated.

7. The structure according to claim 6, wherein each of the gores has a width which is larger than a distance between the two adjacent reinforcing ropes attached to the gore when the gasbag is in the fully inflated state, and each of the gores has a length which is larger than a length of each of the reinforcing ropes attached to the gores, and each of the gores is shortened by pleating the gore so that a length of each edges of the shortened gores is equal to a length of each of the reinforcing ropes attached to the shortened gores, and the reinforcing ropes are attached to the gores while maintaining the gores pleated.

8. The structure according to claim 6, wherein two portions of the gasbag located near sides of the narrow portion are symmetrical.

* * * * *